(12) United States Patent
Parsons

(10) Patent No.: US 7,207,132 B1
(45) Date of Patent: Apr. 24, 2007

(54) BAIT RIGGING HOLDER

(76) Inventor: Scott Parsons, 10829 Wilmore Dr., Raleigh, NC (US) 27614

( * ) Notice: Subject to any disclaimer, the term of this patent is extended or adjusted under 35 U.S.C. 154(b) by 0 days.

(21) Appl. No.: 11/307,020

(22) Filed: Jan. 19, 2006

(51) Int. Cl.
*A01K 97/00* (2006.01)

(52) U.S. Cl. ............................ 43/4; 452/194

(58) Field of Classification Search .............. 43/4, 43/55; 452/194–196, 185, 187; 269/54.4, 269/54.5, 289 R, 303, 308, 309
See application file for complete search history.

(56) References Cited

U.S. PATENT DOCUMENTS

| | | | | |
|---|---|---|---|---|
| 418,310 A * | 12/1889 | Cott ..................... 269/289 R |
| 2,082,754 A * | 6/1937 | Peterson ........................ 43/4 |
| 2,339,690 A * | 1/1944 | Farish ...................... 269/54.4 |
| 2,401,054 A * | 5/1946 | Daley ........................ 269/303 |
| 2,442,557 A * | 6/1948 | Cox .......................... 269/54.5 |
| 2,464,114 A * | 3/1949 | Bloecher ................... 269/54.5 |
| 2,480,924 A * | 9/1949 | Heger ............................. 43/4 |
| 2,502,816 A * | 4/1950 | Bennek .......................... 43/4 |
| 2,511,828 A * | 6/1950 | Andrist .......................... 43/4 |
| 2,531,551 A * | 11/1950 | Brecht et al. ................... 43/4 |
| 2,611,982 A * | 9/1952 | Sears ............................. 43/4 |
| 2,652,079 A * | 9/1953 | Worthen .................... 269/309 |
| 2,680,424 A * | 6/1954 | Brown ......................... 43/55 |
| 2,704,594 A * | 3/1955 | Gorby ....................... 452/194 |
| 2,880,545 A * | 4/1959 | Stadler .......................... 43/4 |
| 2,883,783 A * | 4/1959 | Del Matter .................... 43/4 |
| 2,885,814 A * | 5/1959 | Schlador ........................ 43/4 |
| 2,916,845 A * | 12/1959 | Grindstaff ...................... 43/4 |
| 2,918,744 A * | 12/1959 | Schmidt ........................ 43/4 |
| 2,929,166 A * | 3/1960 | Sneide ........................... 43/4 |
| 2,931,551 A * | 4/1960 | Zalkind ..................... 269/303 |
| 2,935,107 A * | 5/1960 | Bertelsen et al. ....... 269/289 R |
| 2,982,045 A * | 5/1961 | Highland ........................ 43/4 |
| 3,065,561 A * | 11/1962 | Swanson ........................ 43/4 |
| 3,098,312 A * | 7/1963 | Shannon ........................ 43/4 |
| 3,271,890 A * | 9/1966 | Davis ............................ 43/4 |
| 3,308,570 A * | 3/1967 | Horton ......................... 43/55 |
| 3,461,590 A * | 8/1969 | Gindele ......................... 43/4 |
| 3,541,722 A * | 11/1970 | Garrison ........................ 43/4 |
| 3,561,043 A * | 2/1971 | Breckenridge et al. ..... 452/194 |
| 3,590,423 A * | 7/1971 | Messer ...................... 452/194 |
| 3,668,739 A * | 6/1972 | Lewis ....................... 452/194 |
| 3,803,743 A * | 4/1974 | Nalepka ......................... 43/4 |
| D231,890 S * | 6/1974 | Kritkausky ................ 269/54.4 |
| 3,862,507 A * | 1/1975 | Martyn .......................... 43/4 |

(Continued)

FOREIGN PATENT DOCUMENTS

FR 2575364 A1 * 7/1986

(Continued)

Primary Examiner—Darren W. Ark
(74) Attorney, Agent, or Firm—Mills Law Firm PLLC

(57) ABSTRACT

A bait rigging holder includes a V-shaped trough supports the bait along its entire length during insertion of rigging needles through the bait. The trough includes a frontal slot that allows the rigging needle to be inserted through the jaw and nose when the bait is vertically oriented. The trough includes a side slot for transverse insertion of the rigging needle through the gill covers, preparatory to tying closure. Both insertions may be made without encountering any point dulling surfaces and allow the fish to be removed after penetration for manually completing the rigging operations. The holder includes provisions for holding a plurality of needles of varying sizes, as well as a support for rigging spools.

9 Claims, 4 Drawing Sheets

U.S. PATENT DOCUMENTS

| | | | | |
|---|---|---|---|---|
| 3,975,853 | A * | 8/1976 | Aaron | 43/4 |
| 4,054,968 | A * | 10/1977 | Statz | 452/187 |
| 4,118,807 | A * | 10/1978 | McCauley | 43/4 |
| 4,118,881 | A * | 10/1978 | McFarlane | 43/4 |
| 4,290,221 | A * | 9/1981 | Dotson, Sr. | 43/4 |
| 4,447,051 | A * | 5/1984 | Price | 269/289 R |
| 4,454,630 | A * | 6/1984 | Shouldis | 452/195 |
| 4,466,601 | A * | 8/1984 | Raines | 269/303 |
| 4,682,803 | A * | 7/1987 | Andrews | 452/196 |
| 4,924,843 | A * | 5/1990 | Waren | 269/289 R |
| 4,977,644 | A * | 12/1990 | Evans et al. | 452/195 |
| 4,979,326 | A * | 12/1990 | Aaron | 43/4 |
| 5,097,617 | A * | 3/1992 | Craven | 43/4 |
| 5,098,338 | A * | 3/1992 | Jensen | 43/55 |
| 5,148,607 | A * | 9/1992 | Lasiter | 43/4 |
| 5,339,532 | A * | 8/1994 | O'Keefe | 43/4 |
| 5,339,554 | A * | 8/1994 | Lippens | 43/4 |
| 5,417,005 | A * | 5/1995 | Hale | 43/4 |
| 5,526,575 | A * | 6/1996 | Hoover et al. | 43/4 |
| 5,546,852 | A * | 8/1996 | Bidwell | 269/289 R |
| 6,117,004 | A * | 9/2000 | Fure | 452/196 |
| 6,164,466 | A * | 12/2000 | Baradat | 452/187 |
| 6,200,212 | B1 * | 3/2001 | Henry et al. | 452/195 |
| 6,438,892 | B1 * | 8/2002 | Oberman et al. | 43/55 |
| 6,581,501 | B2 * | 6/2003 | McGrath | 269/303 |
| 6,594,939 | B2 * | 7/2003 | Ondusko | 43/4 |
| 6,622,998 | B2 * | 9/2003 | Wong | 269/289 R |
| 6,765,155 | B1 * | 7/2004 | Gray | 43/4 |
| 6,779,787 | B2 * | 8/2004 | Gryder et al. | 269/289 R |
| 7,143,540 | B2 * | 12/2006 | Lessman et al. | 43/4 |
| 2005/0198886 | A1 * | 9/2005 | Rojas | 43/4 |
| 2005/0223616 | A1 * | 10/2005 | Beasley | 43/4 |
| 2005/0284012 | A1 * | 12/2005 | Lessman et al. | 43/4 |
| 2006/0081192 | A1 * | 4/2006 | Massey et al. | 43/4 |
| 2006/0272195 | A1 * | 12/2006 | Ekker | 43/4 |

FOREIGN PATENT DOCUMENTS

| | | | |
|---|---|---|---|
| FR | 2582190 A | * | 11/1986 |
| GB | 2416655 A | * | 2/2006 |
| JP | 8-163942 A | * | 6/1996 |
| JP | 10-201404 A | * | 8/1998 |
| JP | 2002-186381 A | * | 7/2002 |

* cited by examiner

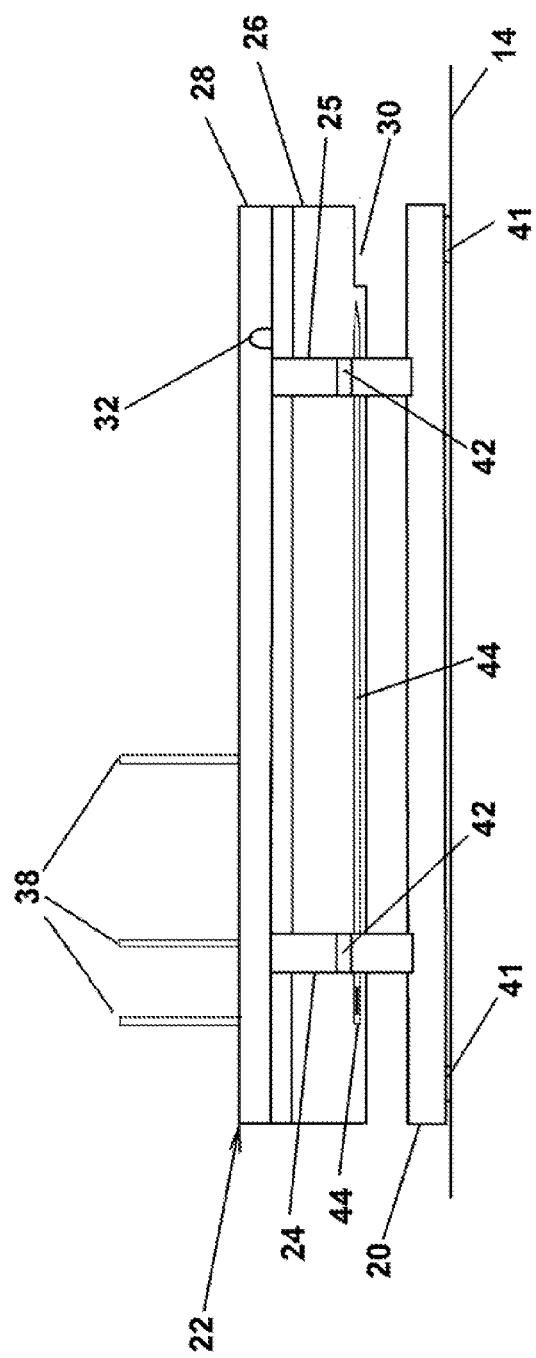

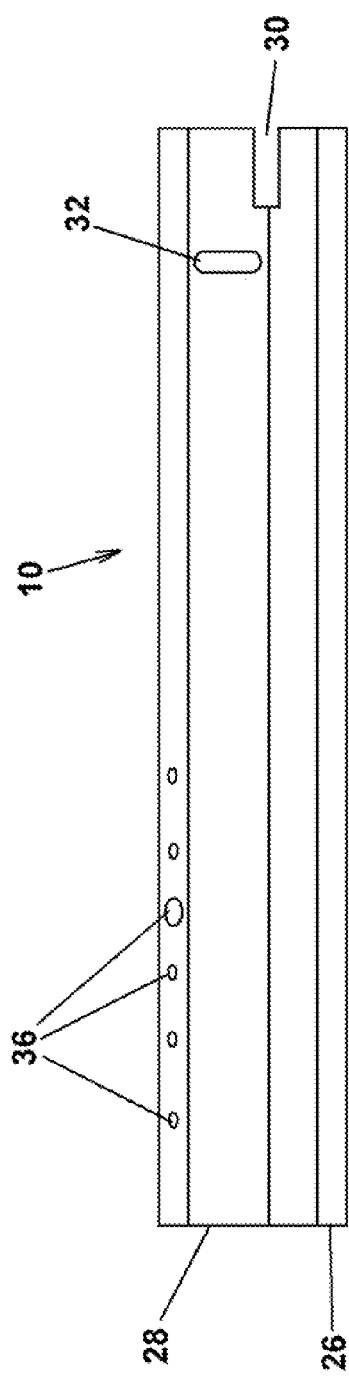
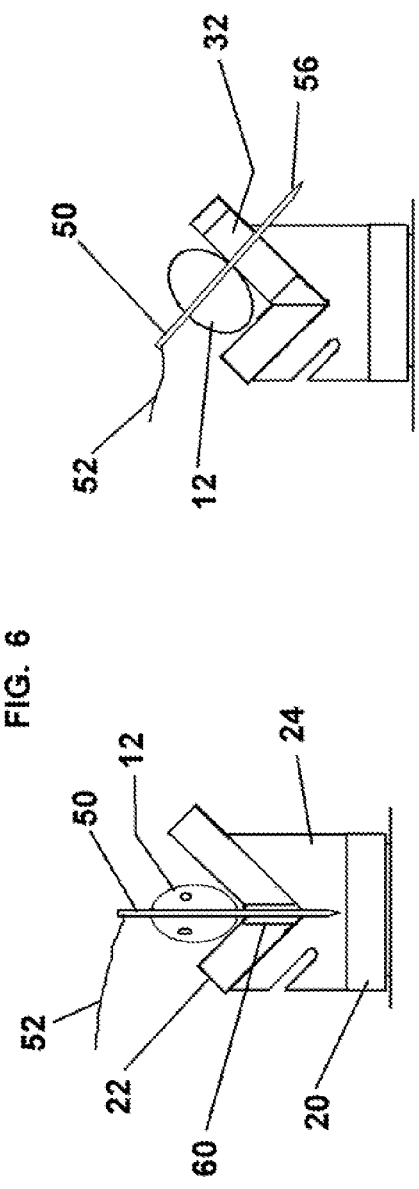
FIG. 6
FIG. 7
FIG. 8

US 7,207,132 B1

BAIT RIGGING HOLDER

FIELD OF THE INVENTION

The present invention fishing lure equipment and, in particular, to a holder for facilitating the rigging of bait.

BACKGROUND OF THE INVENTION

The proper rigging of natural bait is a valued skill for experienced anglers. The rigging prepares the bait for natural travel on the fishing line for presenting the best attraction to lure target species. Techniques vary with the bait species. For bait fish, it is preferred to rig the bait by closing both the gills and nose of the fish, commonly know as nose rigging. This is generally done by holding the fish and inserting a rigging needle with thread line transversely through the fish at the gills and tying line to close the gill covers. Thereafter, the needle is inserted through the jaw and nostrils of the fish. Finally, a towing loop is fashioned, for attachment to the reel line.

Many fishermen prefer hand rigging, holding the bait and inserting the rigging needle through the fish in the rigging sequence. Performing the rigging on board a boat, particularly in rough water, poses the danger of physical injury to the rigger. Alternatively, the needle may be inserted by holding the bait against a solid surface and the resulting contact can dull or break the needle point.

Fish holding devices have been disclosed, primarily for holding the caught species for cleaning. U.S. Pat. Nos. 5,098,338 and 4,977,644 disclose V-shaped supports for holding the fish during cleaning. Both have solid support surfaces that would be disadvantageously impacted if rigging thereon were contemplated. Lure specific rigging devices have also been proposed. U.S. Pat. No. 2,502,816 discloses a slotted conical holder for inserting barbed hooks into small bait fish such as minors. U.S. Pat. No. 2,880,545 discloses a template for inserting Longitudinal and transverse barbed hooks into bait. None would address the mentioned problems regarding the nose rigging of bait fish.

SUMMARY OF THE INVENTION

The present invention provides a holder for stably and safely rigging bait fish, particularly nose rigging. Herein, a V-shaped trough supports the bait fish along its entire length. The trough includes a frontal slot that allows a rigging needle to be inserted through the jaw and nose when the bait is vertically oriented. The trough includes a side slot for transverse insertion of the rigging needle through the gill covers, preparatory to tying closure. Both insertions may be made without encountering any point dulling surfaces and allow the fish to be removed after penetration for manually completing the rigging operations. The holder includes provisions for holding a plurality of needles of varying sizes, as well as a support for rigging spools. The holder is adapted for use on the fishing boat at typical tackle stations or on commonly available accessories. According, the rigger may quickly and safely rig bait, of all types and sizes, without risking physical injury or equipment damage

BRIEF DESCRIPTION OF THE DRAWINGS

The above and other features and advantages of the present invention will become apparent upon reading the following description taken in conjunction with the accompanying drawing in which:

FIG. 2 is side view of the bait rigging holder of FIG. 1;

FIG. 3 is a front view taken along line 3—3 of FIG. 2;

FIG. 4 is a cross sectional view taken along line 4—4 of FIG. 2;

FIG. 5 is a cross sectional view taken along line 5—5 of FIG. 2;

FIG. 6 is a top view of the bait rigging holder of FIG. 1;

FIG. 7 is a view similar to FIG. 3 showing vertical insertion of the baiting needle through the bait;

FIG. 8 is a view similar to FIG. 5 showing transverse insertion of the baiting needle through the bait.

DESCRIPTION OF THE PREFERRED EMBODIMENTS

Figure 1:
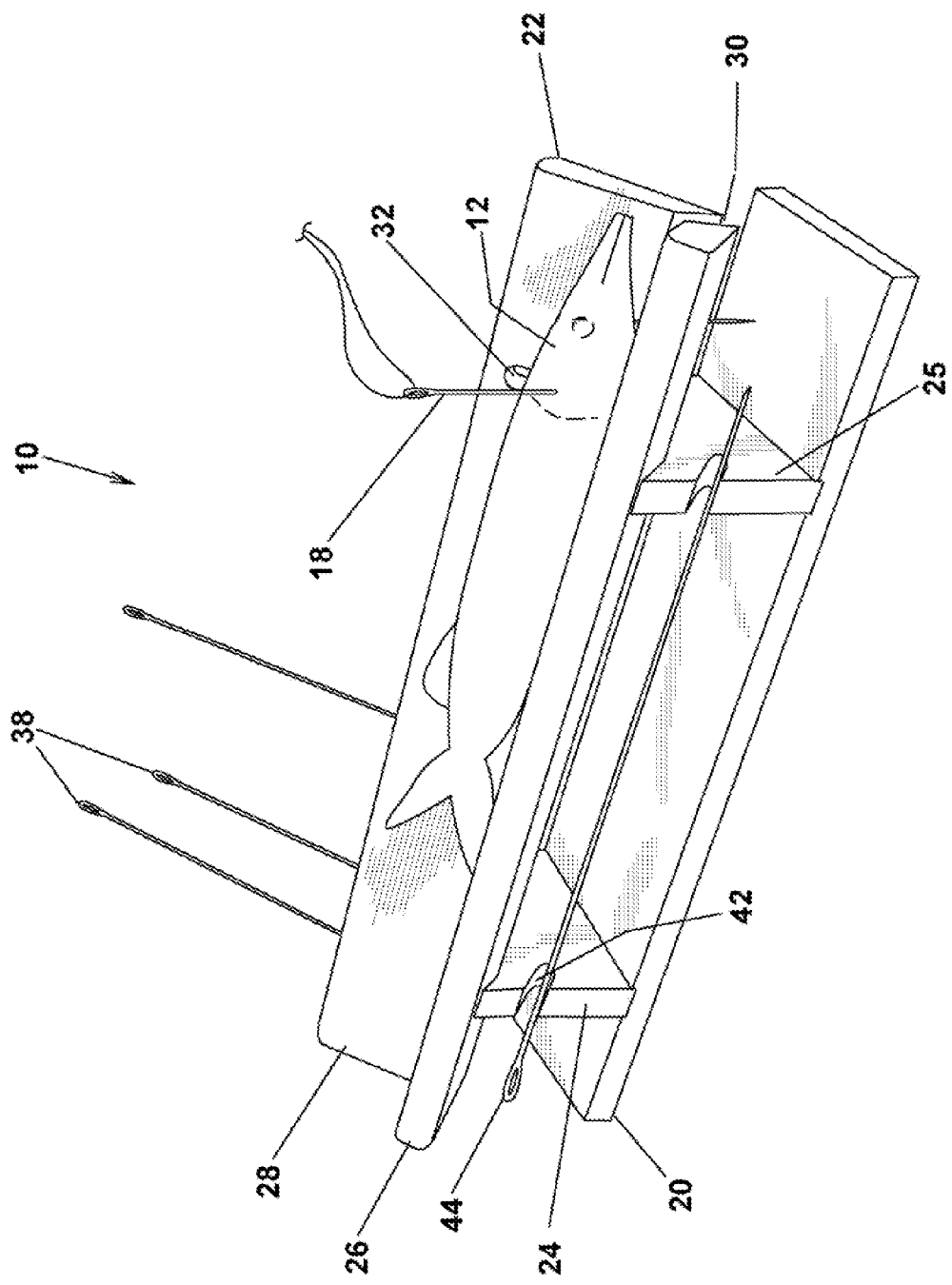
FIG. 1 is a perspective view of a bait rigging holder in accordance with an embodiment of the invention.

Referring to FIG. 1, there is shown a bait rigging holder 10 for facilitating the rigging of a bait 12. In use, the holder 10 is positioned on a support surface of a fishing accessory, such as a chair tackle station on a boat, a cooler, a tackle station or the like. A rigging needle 18 is threaded transversely through the bait 12 behind the gills in one of the rigging positions described in greater detail below. The holder 12 is suited for fish, such as illustrated, of varying sizes such as ballyhoo, small mackerel, small mullet, squid and other small baits used in fishing, and may be sized for handling larger baits such as mackerel, tuna, mullet and other larger bait.

Referring additionally to FIGS. 2 through 6, the holder 10 includes a generally rectangular base 20 carrying a longitudinally extending V-shaped trough 22 on a pair of front and rear support legs 24, 25, respectively. The holder may be made from suitable planar materials such as wood or plastics. The trough 22 includes a front side plate 26 and a rear side plate 28, both of which are generally rectangular and extend the length of the base 20. The plates 26 and 28 are mechanically or adhesively joint at a base at their inner ends. The front plate 26 is narrower in width than the rear plate 28 for facilitating frontal access to the angle during baiting and for assisting the baiting needle insertion as described below. The plates 26 and 28 span an included angle that provides stable orientation of the bait when oriented in the vertical rigging position shown in FIG. 7 or the transverse rigging position shown in FIGS. 1 and 8. It has been found that an included angle of about 75° to 135° provides desired results. A narrower angle tends to impair transverse rigging, whereas a wider angle does not adequately support vertical rigging. An angle of about 90° is preferred. The trough may be provided in varying length depending on the bait being rigged. Generally, two sizes are preferred, one for the small bait and a longer and wider unit for the large bait.

The trough 22 is provided with a frontally opening slot 30 at the base of the inner ends of the plates 26, 28. The slot 30 terminates forwardly of the front support leg 24. The rear side plate 28 is provided with a transverse slot 32 positioned slightly forwardly of the front support leg 24 and slightly vertically behind the base of the slot 30. As shown in FIGS. 2 and 4, the rear plate 28 includes a plurality of holes 36 formed transversely through the side surface thereof for holding additional baiting needles 38 and/or other baiting accessories.

Figure 9:
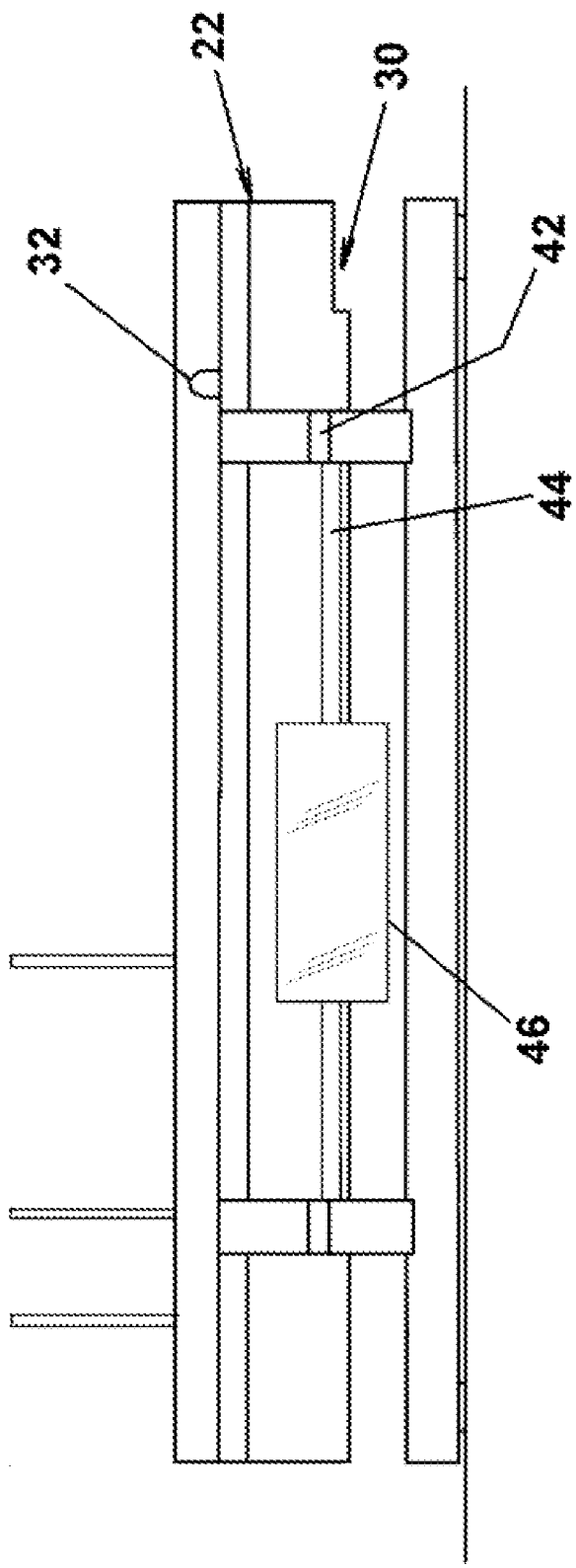
FIG. 9 is a side view of a bait rigging holder in accordance with another embodiment of the invention.

The base 20 includes a pair of transverse dados for receiving the lower ends of the support legs 24, 25. The legs have a width and thickness for receipt in the dados and have a V-shaped notch 40 in the upper ends for receiving the lower surfaces of the trough 22. Rubber pads 41 are provided on the lower surface of the base to prevent movement on the support surface. Upwardly diverging and opening slots 42 are formed in the front of the legs 24, 25 for transversely supporting a longer rigging needle 44, or other rigging tools. Referring to FIG. 9, the slots 42 can also hold a rod 46 for support spools 48 of rigging thread. The rod may comprise an accessory tool such as a deboner. The base 20 may include a recessed upper surface forming a tray 49 for holding other related rigging items.

For rigging, referring to FIG. 8, it is generally preferable to first close the gill covers. This is accomplished by placing the bait 12 against the rear side plate 28, with the gills of the bait aligned with the transverse slot 32. The selected rigging needle 50, with thread 52 attached at the eyelet, is inserted transversely through the bait with the tip 56 passing freely through the slot 32. The bait may then be removed and the tying completed to securely close the gill covers. Thereafter, as shown in FIG. 7, the bait 12 is located vertically in the trough and the rigging needle 50 vertically inserted through the nose and jaw of the fish in one vertical direction, passing without obstruction through the frontal slot 30. Thereafter, the bait is inverted and the needle inserted in the opposite direction through the bait. The bait may then be removed for completing the rigging operations for attachment to the fishing line.

It will thus be appreciated that the present invention provides a holder usable for stably and quickly rigging a variety of bait without attendant safety for personnel and equipment.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claim.

What is claimed is:

1. A bait rigging holder for rigging bait comprising: an elongated bait holding member having a longitudinal axis and side members, said side members being longitudinally joined at inner ends and diverging upwardly and outwardly therefrom to form an upwardly opening trough having a front end and a rear end, said trough longitudinally supporting the bait with the nose at the front end thereon when the bait is placed in the trough; a frontally opening first slot formed in said inner ends of said side members at said front end of said trough allowing passage of a rigging needle through the nose of the bait; a transversely extending second slot formed through one of said side members slightly longitudinally behind said first slot, said second slot thereby allowing passage of a rigging needle through the gills of the bait; and front and rear vertical support members having lower ends connected with a horizontal base member and having upper ends engaging lower surfaces of both of said side members, said side members being entirely spaced above said horizontal base member along entire lengths of said side members, said front support member both being located rearwardly of said first slot and engaging the lower surfaces of said side members at a location along the longitudinal axis that is between said first slot and said rear support member.

2. The bait rigging holder as recited in claim 1 including third slots formed in said vertical support members for retaining an elongated fishing accessory.

3. The bait rigging holder as recited in claim 2 wherein said fishing accessory is a cylindrical member carrying a spool of rigging thread.

4. The bait rigging holder as recited in claim 3 wherein said cylindrical member is a deboner.

5. The bait rigging holder as recited in claim 2 wherein an one of said side members includes a plurality of transverse openings for holding rigging needles.

6. The bait rigging holder as recited in claim 1 wherein an included angle between said side members is in the range of about 75° to 135°.

7. The bait rigging holder as recited in claim 6 wherein said included angle is about 90°.

8. The bait rigging holder as recited in claim 1 wherein one of said side members has a larger width that the other of said side members.

9. The bait rigging holder as recited in claim 1 wherein said front support member is located rearwardly of said second slot.

* * * * *